US008433427B2

(12) United States Patent
Glomann et al.

(10) Patent No.: US 8,433,427 B2
(45) Date of Patent: Apr. 30, 2013

(54) METHOD FOR MONITORING OPERATION BEHAVIOUR OF A COMPONENT OF AN INDUSTRIAL PLANT

(75) Inventors: Bernhard Glomann, Riviera Beach, FL (US); Holger Hackstein, Dietzenbach (DE)

(73) Assignee: Siemens Aktiengesellscahft, München ( * ) Notice: Subject to any disclaimer, the term of this patent is extended or adjusted under 35 U.S.C. 154(b) by 397 days.

(21) Appl. No.: 12/842,113

(22) Filed: Jul. 23, 2010

(65) Prior Publication Data

US 2011/0022214 A1 Jan. 27, 2011

(30) Foreign Application Priority Data

Jul. 23, 2009 (EP) .................................... 09166181

(51) Int. Cl.
*G06F 19/00* (2011.01)
(52) U.S. Cl.
USPC ........................................... 700/30; 702/181
(58) Field of Classification Search ............... 700/30, 700/35, 116, 169, 170, 108; 702/181; 701/100, 701/14, 29
See application file for complete search history.

(56) References Cited

U.S. PATENT DOCUMENTS

| | | | |
|---|---|---|---|
| 4,937,763 A | | 6/1990 | Mott |
| 5,190,215 A * | | 3/1993 | Habermehl et al. ......... 236/91 F |
| 5,598,076 A * | | 1/1997 | Neubauer et al. ........ 318/568.22 |
| 6,208,953 B1 * | | 3/2001 | Milek et al. ...................... 703/7 |
| 6,568,254 B2 * | | 5/2003 | Pross .......................... 73/112.01 |
| 6,587,737 B2 * | | 7/2003 | Voser et al. ..................... 700/30 |
| 6,609,036 B1 | | 8/2003 | Bickford |
| 6,996,771 B1 | | 2/2006 | O'Brien |
| 2004/0078171 A1 | | 4/2004 | Wegerich et al. |
| 2005/0278143 A1 | | 12/2005 | Wegerich et al. |
| 2007/0014183 A1 * | | 1/2007 | Shuto ....................... 365/230.06 |
| 2008/0243344 A1 * | | 10/2008 | Casey et al. .................... 701/50 |

OTHER PUBLICATIONS

Naghedolferize et al.; Operating, Monitoring, and Controlling Plant Compomnent over Cyberspace; 2002; Front Valley State University; p. 887-894.*

Kakde et al., Montoring of tool Status Unsing Intellegent Acoutic Emission sensing and secision Based Neural Network, Indian Institute of Technology, 1995, p. 25-29.*

* cited by examiner

*Primary Examiner* — Kidest Bahta

(57) ABSTRACT

A method for monitoring operation behavior of a component of an industrial plant is provided. Parameter identifiers of operation parameters of the industrial plant are read from an element of a control system of the plant. Some of these parameter identifiers are selected and the selected parameter identifiers are forwarded to an element of the control system. Further, a time of a specified operation of the component is defined and behavior of the selected parameters of the component in the defined time is used as guide model for monitoring selected parameters of the component during component operation.

8 Claims, 3 Drawing Sheets

METHOD FOR MONITORING OPERATION BEHAVIOUR OF A COMPONENT OF AN INDUSTRIAL PLANT

CROSS REFERENCE TO RELATED APPLICATIONS

This application claims priority of European Patent Office Application No. 09166181.9 EP filed Jul. 23, 2009, which is incorporated by reference herein in its entirety.

FIELD OF INVENTION

The invention relates to a method for monitoring operation behaviour of a component of an industrial plant.

BACKGROUND OF INVENTION

During operation components of an industrial plant are monitored with the aid of sensors each furnishing a control and communication system of the plant with sensor data of a monitored parameter. Together with additional controlling data from controlling parameters the sensor data form a pool of monitoring data, each being assigned to a parameter, like a measured parameter, as temperature, pressure, or vibration, or a controlling parameter, like flags, command signals, or status signals, like switching status.

For monitoring components of the plant some or all sensor parameters are associated with threshold values, the sensor data exceeding or falling below such threshold value triggering a message or an alarm.

SUMMARY OF THE INVENTION

It is an object of the invention to provide a method for reliably and sensibly monitoring operation behaviour of a component of an industrial plant.

This object is solved by a method as introduced above, wherein parameter identifiers of operation parameters of the industrial plant are read from a control system of the plant, and some of these parameter identifiers are selected and given to the control system. A time of a specified operation of the component is defined and the behaviour of the selected parameters, in particular of the component, in the defined time is used as guide model for monitoring selected parameters during component operation. A situational monitoring of the component is possible according to the behaviour of the selected parameters during selected time.

The monitoring may be conducted on a model based state description of the monitored component of the plant. The model may be generated completely from archived sensor data, eventually together with controlling data, since sensor data—and eventually controlling data, altogether called monitoring data in the following—carry all relevant information about interaction of components and processes, and about the operation history of the monitored components or the plant. Reading out the parameter identifiers from the plant control system makes them accessible for external handling, simplifying selection or bundling for the respective component to be monitored.

The time defined for selecting a specified operation of the component may be a time period from a first selected moment to a second selected moment—so interaction results of the monitoring parameters may be part of the guide model—or a single moment as such.

The industrial plant may be a manufacturing plant, a power plant, a service installation, like a part of an airport, or a transportation system for people or goods, or a part thereof. The component may be a boiler, a turbine, a generator, a pressure pump, a manufacturing unit, or the like. The parameters are measured parameters and/or control parameters of the plant, altogether called monitoring parameters or simply parameters in the following. The operation of such component is described by values of a plurality of parameters, each parameter being tagged by a parameter identifier distinctly identifying the respective parameter.

All parameter tags or identifiers of the plant may be stored in the control and communication system of the plant and may be read out into a file for selection purposes. A data base or archive accessible by a system of the control system of the plant in this context is seen as well as part of the control system of the plant. All parameter identifiers of the plant may be read out or a selected part thereof, for instance if the plant is divided into sections with separatable parameter identifiers for every section.

Preferably the read parameter identifiers are transferred into an editable like an editable list, so the listed identifiers may be reordered or some of the parameter identifiers may be deleted. The selection is eased if the selection comprises a filtering process, preferably with a filter operator for automatic filtering with a filtering attribute, like a character sequence, a physical unit, or a number or number threshold.

After the selection process the remaining parameter identifiers are given back to the control system of the component or of the plant. Preferably the selected parameter identifiers are given back in a machine readable form, especially a machine executable code, like an XML-file or the like.

The defining of the time makes it possible to select a certain operation based situation, like a normal operation of a selected operation situation or selected operation mode respectively. Such situation or mode could be a start up procedure of a rotating machine, a full load operation, or normal or low load operation of the component. The selected parameters identified by the selected parameter identifiers and the selected time describe the selected operation situation of the component. If a time of normal operation of the selected operation mode is defined, like an undisturbed operation with a preferred behaviour in all parameters, the selected parameters form a basis for an operation model of the situation based operation of the component. This model is generated and used as guide model for monitoring the component.

With this a method for monitoring an operation situation based behaviour of a component is achieved. The method may be part of a method for monitoring and/or controlling the plant, whereby an intervention in control routines according to monitoring results is a possible method.

With a monitoring of the deviation of the selected parameters of the component from the selected parameters of the guide model during component operation, or monitoring the respective values of the parameters, any abnormal parameter behaviour may be detected with high precision. Even if a parameter is always within absolute upper and lower signalling thresholds a situation based abnormal behaviour characterized by a major deviation from a model based expectancy value may easily be detected, and used for giving a signal to an operator or a controlling routine. A major deviation may be defined by a deviation threshold, like 3% from expectancy value given by the model.

BRIEF DESCRIPTION OF THE DRAWINGS

The invention is explained in further detail by virtue of the following preferred embodiment of the invention with the aid of drawings, wherein the following is shown.

DETAILED DESCRIPTION OF INVENTION

Figure 1:
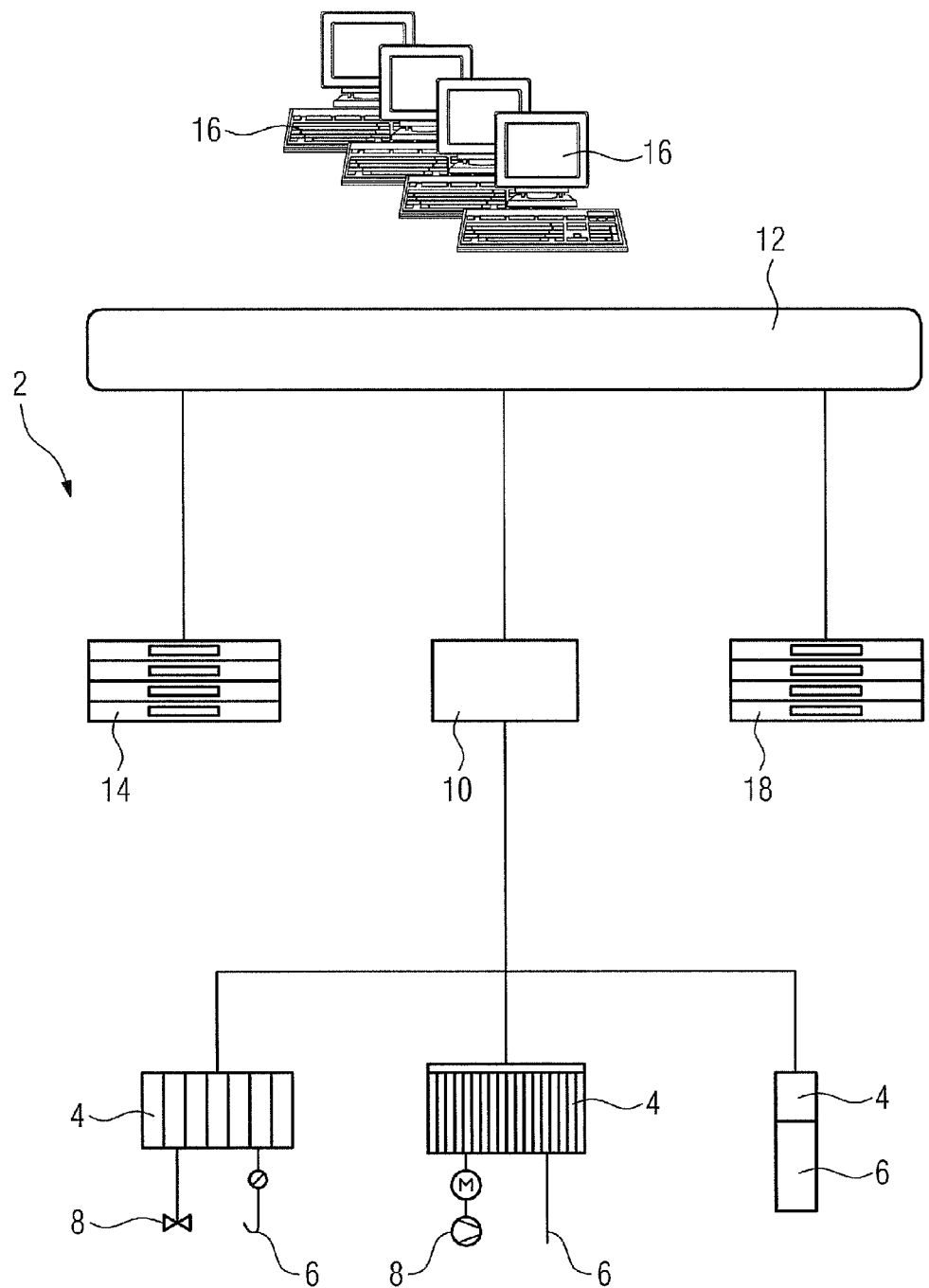
FIG. 1 shows a schematic view of a control system of a power plant.

FIG. 1 shows a schematic overview of a control and communication system 2 of a power plant with a plurality of plant components 4. The components 4 each comprise a field of sensors 6 and actuators 8 necessary for operating the component 4. Each component 4 is assigned to an automation server 10 for controlling the respective component 4. The automation server 10 is for controlling a part of the plant, like a steam turbine, the plant comprising a plurality of such parts and automation servers 10, only one being shown in FIG. 1, whereas the components 4 are part of the plant part respectively the steam turbine in this embodiment. The automation servers 10 are connected with a bus system 12, like a plant bus or a LAN system.

Figure 2:
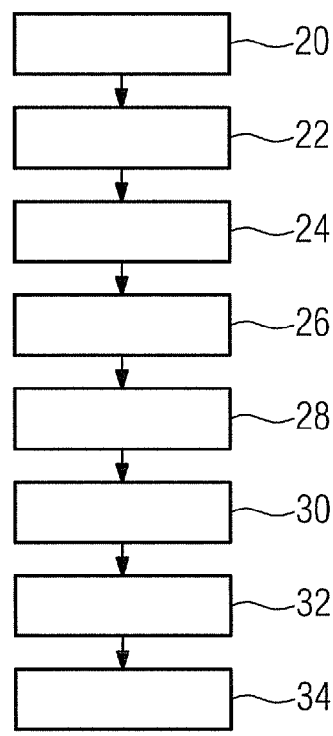
FIG. 2 shows a flow diagram of a monitoring method.

For management of all plant parts of the plant an application server 14 is present connected via the bus system 12 with a plurality of clients 16 for operation and monitoring the Industrial plant. The control system 2 comprising the application server 14 of the industrial plant, the automation servers 10 of every part of the plant, the bus system 12 and the clients 16, is further furnished with a technology server 18 on which a plant monitor is installed which is described now in further detail along with FIG. 2, FIG. 3 and FIG. 4.

In a first step 20 an operator initiates that parameter identifiers, like parameter tags, of the plant are read out from the control system, e.g. a date base associated with the technology server 18, and transferred into a list stored in one of the clients 16 or even an external computer via bus system 12, and eventually via Internet. The parameter identifiers may be all parameter identifiers associated with the whole industrial plant, like 30,000 identifiers. The parameter identifiers each represent only one parameter, a measured parameter or a control parameter, of the plant. In this list the parameter identifiers are present in an editable form.

In a second step 22 the number of parameter identifiers is reduced by a filtering process. This process is preferably governed by a filtering program or filtering function of a program together with one or more filter parameters. The filter parameter may be a physical parameter, so that all parameter identifiers remain representing a vibration, or temperature, or pressure, or the like. On the other hand a filter parameter may be a character or number or character string or number string of the identifiers names.

The remaining identifiers may be clustered in a third step 24. For this the operator chooses the component to be monitored and chooses all or some of the remaining identifiers associated with this component and eventually other identifiers being useful for generating the guide model for the monitoring process. Advantageously those parameters—or more precise: their identifiers—are chosen, which have an influence on the operation condition and/or the controlling of the component. For instance, in the case the component being a gas turbine, besides measured parameters of the turbine those external parameters should be added having an influence on power, operation condition and/or durability of the turbine, like ambient temperature and ambient pressure.

Alternatively step 24 may be omitted at all or done automatically by a control system which then preferably is connected to a data base containing an allocation of the component to parameter identifiers of such parameters which have an influence on the operation condition and/or the controlling of the component.

After clustering 24 the parameter identifiers, in step 26 the remaining identifiers are used to generate a machine readable description of elements and connections of the control system that relate to the remaining and selected parameters. The machine readable description comprises all elements and connections of the control system that are needed for modelling and monitoring the remaining and selected parameters. The information necessary for generating such description is enclosed in the control system as such since the control system comprises all elements and connections which are necessary for controlling the industrial plant. The plant monitor selects from all elements and connections only those which are needed for modelling and monitoring the remaining and selected parameters. The plant monitor contains then a part of the control system of the plant as a control system model.

Figure 3:
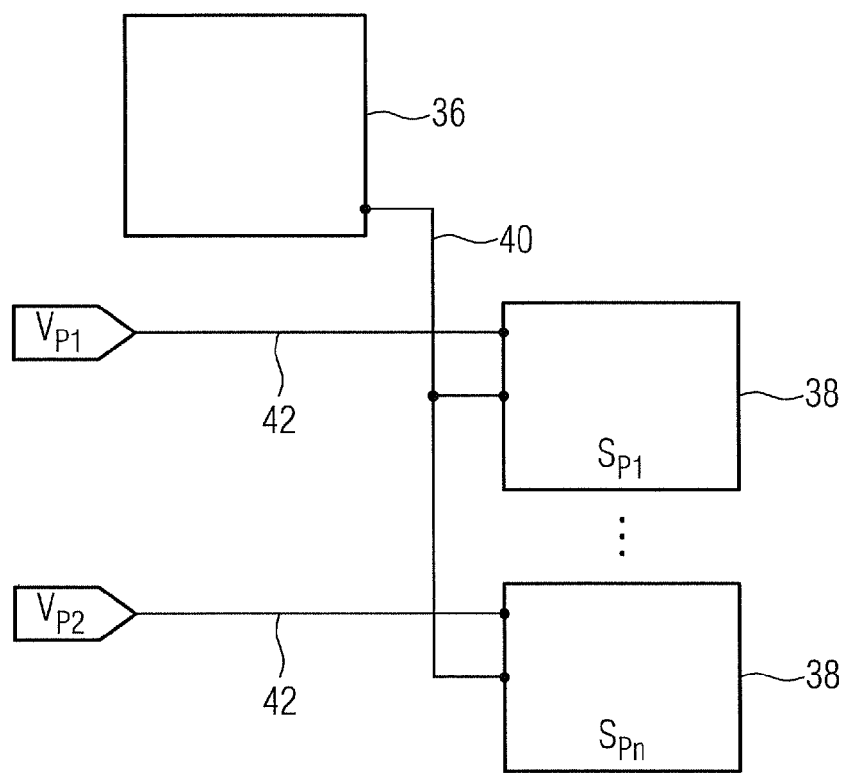
FIG. 3 shows a diagram of a model in a plant monitor containing n parameter.

In a preferred embodiment of the invention, the plant monitor comprises two types of software elements: controller and state estimator. In order to monitor a set of parameters using a common guide model, one controller instance is generated for the model, and one state estimator is generated for each parameter. A model for only two selected parameters is shown in FIG. 3 which is described later. The machine readable description generated in step 26 includes these elements as well as the necessary connections to the control system through which the plant monitor is supplied with the current parameter values for modelling and monitoring. The machine readable description may be of XML-format or the like.

The algorithm for generating the machine readable description comprises the following steps:

1. Initialize the machine readable description as an empty description of control system components and connections.
2. Add an element representing a controller of the plant monitor.
3. For each parameter $P_i$ in the selected set of parameters, i=1, . . . n; n being the number of selected parameters:
   a. Add an element representing a state estimator $S_{Pi}$, of the plant monitor.
   b. Add an element representing a connection between the controller and the state estimator.
   c. Add an element representing a connection between the state estimator and the control system for transferring the current value of the parameter $P_i$ to the state estimator.

This description contains now the selected parameter identifiers together with commands for the control system 2 to generate a structure of control system 2 modeling elements representing the parameters $P_i$ of the selected parameter identifiers.

After transformation in step 28 the machine readable description is given to the control system 2, in particular the plant monitor, of the plant or the control system of the component of the plant to be monitored. The control system then instantiates the elements and connections according to the description. It generates a structure of control system modeling elements 38 representing the parameters of the selected parameter identifiers. This structure comprises a model of a part of the control system 2.

Alternatively the parameter identifiers are given to the control system beforehand and transformed into the machine readable code by the control system being able to admit the identifier list and converting it into machine readable code.

The plant monitor is now able to virtually simulate the operation of the component. For each measured parameter, plant monitor provides a state estimator for estimating a parameter state and giving a parameter value during operation, respectively simulation or modelling phase, at any time. The given parameter value will be fluctuating during operation depending on the modelled state.

The relationship between the parameters of the component, in particular for all parameters of the plant influencing the component, is deposited in the control system of the plant or somewhere else in the control system available for the plant monitor and is overtaken from the plant monitor. The relationship rules the influence of the parameters onto each other during operation. The actual influences may be calculated with a neuronal net or other suitable calculation means. The generation of the guide model may be done fully automatically by the calculation means on the base of the list of the parameter identifiers and their known relationships, i.e. influences onto each other.

When the guide model is generated it is trained by providing it with a time of a specified operation of the component in step 30. This time is preferably a time period which in particular is defined by a beginning moment and an ending moment. The time period normally covers a few hours or days if no strongly fluctuating normal behaviour is present over a longer period of time, e.g. due to weather or seasonal influences.

This time may be selected by an operator and is such a time in which the component had run in the specified operation, preferably normal operation of a regular operation mode. Normal operation does not need to be optimal operation but may comprise for instance rough operation if such rough operation has proven to be regular and stable over a certain period of time allowing the plant to operate as desired. The operation mode may be an operation start, an operation under a specific load, velocity, or temperature, or the like. In the archive or a data base of the control system values of the parameters—preferably all parameters of the plant—are stored which occurred during the selected time period. These values serve the plant monitor for training the guide model according to the selected operation in step 32.

With the training 32 the guide model is acquainted to normal operation of the component. Expectancy values are created for all chosen parameters serving as guide values for the parameters to be monitored in step 34.

FIG. 3 shows a diagram of a simple model of the plant monitor containing an element representing a controller 36 and n elements representing n state estimators 38, each for one of the n selected parameter $P_1, \ldots P_n$. Each of the state estimators 38 is supplied with a data connection 40 to the controller and a data connection 42 to the control system for receiving the current value $v_{Pi}$ of the respective parameter during component operation to be monitored. The controller 36 contains the archive data of the selected time and/or the data material representing the influence of the parameter $P_n$ upon each other calculated from the archive data.

During operation of the component the controller 36 receives all current values $v_{Pi}$ of all selected parameter via the state estimators 38 and provides the state estimator 38 with model data representing the influence of the parameter $P_i$ upon each other. Continuously or in periodic time intervals the state estimator 38 calculate an expectancy value for their parameter $P_i$, generating a function $P_i(t)$ of the parameter $P_i$ over the time t during operation. The expectancy values for the parameter $P_i$ each represent normal operation of the component, i.e. the operation mode chosen by choosing the time.

Figure 4:
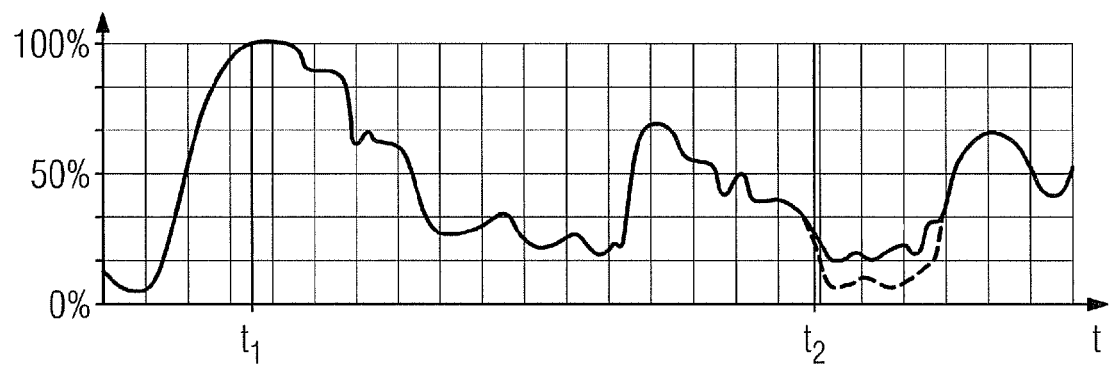
FIG. 4 shows a diagram of an expectancy value of a monitored parameter and a measured value of this parameter.

FIG. 4 shows a developing of an expectancy value of the guide model and a developing of a value measured by a sensor (broken line) of one chosen parameter during normal operation over a time period. The values fluctuate strongly over the time but lie so close together that they practically fall together. Only at the right side of the diagram they fall apart signalling an abnormal occurrence. The expectancy value is generated in real time by the plant monitor, always opposing the expectancy value to the measured value, preferably for comparison of these values.

During normal operation the parameter values may fluctuate very much, e.g. according to a change of an operation mode. If a guide model is present for more than one operation mode a change between operation modes may easily be followed by the guide model tracking or updating the actual mode in the model and so adapting to the new mode automatically.

Measured values of a parameter are usually monitored by simple threshold values, a pass of the value over the threshold value triggering a signal, like an alarm or the like. However, sometimes a pass over a threshold value is normal for regular or normal operation in specific situations causing a dispensable signal for an operator. Such a regular pass over the upper threshold value is shown at $t_1$ in FIG. 4. With the aid of the guide model plant monitor recognizes that this passing over the threshold value is no evidence for abnormal behaviour but normal for this specific operation situation. Plant monitor identifies the behaviour as normal although its value is partly quite high and exceeds the threshold value. Plant monitor therefore is able to suppress a signal normally given upon a parameter pass over or below a threshold value.

On the right side of the diagram the expectancy value and the measured value fall apart at time $t_2$ for more than 3% of the expectancy value. Plant monitor therefore concludes that the measured value should be higher in accordance with the values of the other parameters chosen for monitoring the component. Plant monitor gives a signal therefore, generating information to an operator on a client computer, that the behaviour of the component results in a lower level of the monitored parameter than expected, giving a hint for an abnormal behaviour.

Figure 5:
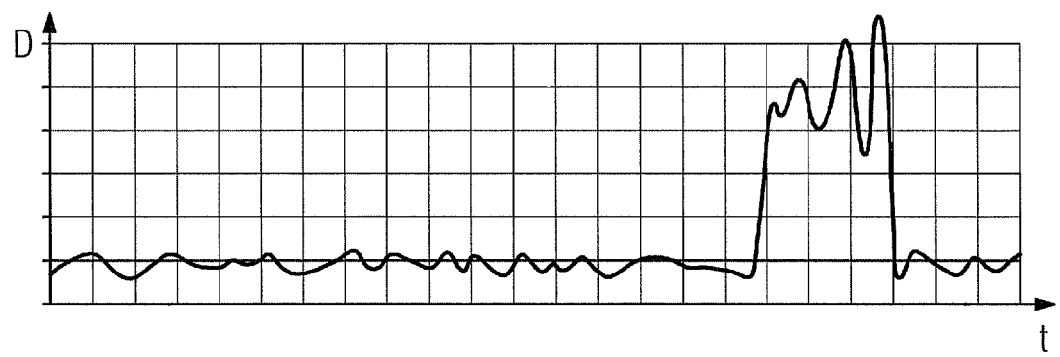
FIG. 5 shows the deviation between the values of FIG. 4.

Deviations D of the measured value from the expectancy value are easily detected by generating the residuum, i.e. the difference between the values. Such residuum is depicted in FIG. 5 showing a diagram of residuum or deviation D over operation time t. As expected the difference is almost zero in the left half of the diagram signalling normal operation of the monitored component. The residuum on the right side of the diagram is much higher and signals a deviation of the measured value from the value expected by the guide model. Plant monitor observes the residuum and sends an alarm upon the residuum exceeding over a given threshold value. The operator is informed via a client computer and may navigate to a plant diagram showing the component and its operation states to analyze the component and its operation. Preferably plant monitor generates a link with the alarm to the respective parameter so an operator may directly jump to the conspicuous parameter.

Upon any residuum of values above a threshold and signalled by the plant monitor operator decides whether the deviation is a hint of a beginning defect of the component or a part thereof, or a normal operation under yet unknown circumstances. If it is normal operation plant monitor may be further trained by assigning the time period, in which the high residuum occurred, to normal operation.

The plant monitor allows for a continuous evaluation of the condition and status of the components 4 of the plant and processes carried out by the components 4 and parts of the plant and the plant as a whole. The evaluation is carried out with the aid of a model-based description of the actual situation of the component or process. The generation and the whole engineering of the models occur exclusively on the base of archived measuring data, since the measuring data carry all relevant information about the physical interaction of components and processes as well as the consistent and whole history of operation.

Plant monitor has the ability to monitor all components and processes of the plant on the base of their trained or normal operation. The respective process or component is determined by the selection of the parameters to be monitored by selecting their parameter identifiers, and it is irrelevant from where the selected parameters come from within the industrial plant. Thus, for example, all blowers of a part of the plant may be united in a single guide model, or a single machine, or even whole process parts or plant components. However, it is important that all phenomena which may change the normal operation behaviour are recognised with the chosen parameters.

The invention claimed is:

1. A method for monitoring operation behaviour of a component of an industrial plant, the method comprising:
    reading out parameter identifiers of operation parameters of the industrial plant from an element of a control system of the plant;
    transferring the read parameter identifiers into an editable form;
    selecting some of these parameter identifiers in the editable form;
    generating a machine readable description containing the selected parameter identifiers together with commands for the control system to generate a structure of control system modeling elements representing the operation parameters of the selected parameter identifiers;
    forwarding the machine readable description to an element of the control system;
    instantiating elements and connections according to the machine readable description and generating a structure of control system modeling elements representing the operation parameters of the selected parameter identifiers by the element of the control system;
    generating a guide model for monitoring the component using the structure by the element of the control system;
    defining a time of a specified operation of the component; and
    using a behaviour of the operation parameters of the selected parameter identifiers at the defined time training the guide model for monitoring selected parameters during component operation by the element of the control system.

2. The method according to claim 1, wherein the selecting of parameter identifiers is a filtering process with a filter operator.

3. The method according to claim 1, wherein the elements each are state estimators for generating expectancy values for the respective parameter.

4. The method according to claim 1, wherein the structure comprises a model of a part of the control system.

5. The method according to claim 1, wherein the specified operation of the component is a normal operation of the component.

6. The method according to claim 1, wherein the time of a specified operation of the component is a time period.

7. The method according to claim 1, further comprising:
    monitoring a deviation of values of the selected parameters of the component from values of the selected parameters of the guide model during component operation.

8. The method according to claim 1, wherein the machine readable description is of a XML-format.

* * * * *